UNITED STATES PATENT OFFICE.

J. R. MOFFITT, OF CHELSEA, AND F. D. HAYWARD, OF MALDEN, MASS.

IMPROVED METHOD OF PROTECTING RUBBER ARTICLES.

Specification forming part of Letters Patent No. 58,870, dated October 16, 1866.

*To all whom it may concern:*

Be it known that we, JOHN R. MOFFITT, of Chelsea, Suffolk county, and FRANCIS D. HAYWARD, of Malden, Middlesex county, all in the State of Massachusetts, have invented an Improvement in Coating Rubber Articles; and we do hereby declare that the following is a description of our invention sufficient to enable those skilled in the art to practice it.

This invention relates to the manufacture of those classes of rubber or gum-elastic goods in which elasticity is not absolutely necessary, as in many articles made to imitate leather, or rather as a substitute for leather—such, for instance, as washers or packing-rings, boot and shoe counters, and other similar productions possessing a considerable degree of flexibility or softness of surface.

In the production of such goods no particular difficulty is experienced in obtaining or imparting sufficient body and firmness; but the articles, in consequence of exposure of their surfaces to air, heat, or moisture, soon decompose to such extent as to destroy their usefulness.

The object of our invention is to protect the surfaces of such articles from direct exposure to air, or from direct contact with other surfaces; and the invention consists in coating articles made from caoutchouc or gum-elastic compounds with smooth paper, this paper being applied in the process of vulcanizing or molding the rubber or other material into shape, and so as to form one or both of the broad surfaces thereof, the close smooth surface of the paper preventing contact of the air with the rubber compound, or direct impartation of heat from the substance against which the article may be placed.

We are aware that it is not new to coat articles made from rubber or gum-elastic compounds with cloth; but such coating does not answer the purpose at which we aim, as the fibers or threads of such coating are more or less open to entrance of air, heat, and moisture.

We are also aware that paper itself has been coated with rubber solutions, as described in various places in "Hancock on India-Rubber Manufactures," and in "Muspratt;" but, to the best of our knowledge, india-rubber or gum-elastic compounds have never been surfaced with paper before such application was made by us.

The application is particularly valuable in preparing articles of rubber in molds, interposing the paper between the rubber and the surfaces of the mold, preventing adhesion of the rubber to the mold, and protecting the surfaces of the molded articles from the subsequent effects of heat, air, and moisture.

Washers which are to be placed in contact with iron are also much improved for use by such coating. As commonly made and applied, the iron draws the sulphur from the washer and causes it to adhere to the metal surface, and also causes decomposition of the rubber. These defects are obviated by the paper surface, which prevents exudation of the sulphur.

We claim as our invention—

Protecting the surfaces of articles made of caoutchouc or gum-elastic compounds by surfacing them, substantially as set forth.

J. R. MOFFITT.
F. D. HAYWARD.

Witnesses:
CHARLES S. COLLINS,
DENNIS CAREY.